Feb. 21, 1933.   C. H. LEIS   1,898,880
BEARING DEVICE
Filed Oct. 2, 1931

Inventor
Carl H. Leis
By Richard S. Harrison
Attorney

Patented Feb. 21, 1933

1,898,880

UNITED STATES PATENT OFFICE

CARL H. LEIS, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA

BEARING DEVICE

Application filed October 2, 1931. Serial No. 566,413.

My invention relates to bearings, relating in particular to improvements in bearing devices of the self lubricating class.

Ordinarily, where high speed shafts or journals are employed in machines of various kinds, wherein lubrication by either oil or grease is made use of in the bearings, frequent renewals or changing of the lubricant is required to prevent destruction of the bearings by excessive friction and consequent high temperature. Furthermore, considerable loss of lubricant occurs by leakage at the ends of the bearings and other parts by which the lubricant can escape. Such leakage not only occasions considerable loss of lubricant, but, unless care be taken to remove same at intervals, it spreads over other parts of the machine structure, collects grit, etc., soils that which comes in contact therewith and presents an uncleanly appearance.

It is the object of my invention to provide bearings, for either shafts or journals operated at high speed, to reduce the friction thereof by employing a bearing having disposed within its bearing surface proper, an antifriction compound, preferably a compound containing graphite, as the basic lubricant supplemented by a film of semiliquid lubricant, automatically provided at intervals. Said bearings being especially adapted for application in places where oiling is undesirable or where the bearings are difficult of access, or likely to be neglected.

By means of my improved bearing, the coefficient of friction is safeguarded and thereby controls the heat generated within its normal running temperature, the life of the same is greatly prolonged; requires no attention for a longer period of time in relation to that of any other type of oilless bearing; is extremely economical in the use of lubricant, as there is no loss by leakage and requiring a very small amount of soft lubricant at intervals only. Other advantages will be apparent from the accompanying drawing and description herein given.

Figure 1:
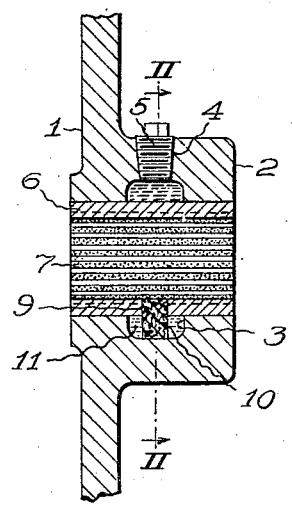
Figure 1 is a side elevation of a head or support having a sleeve bearing therein constituting one embodiment of my invention.
Figure 2:
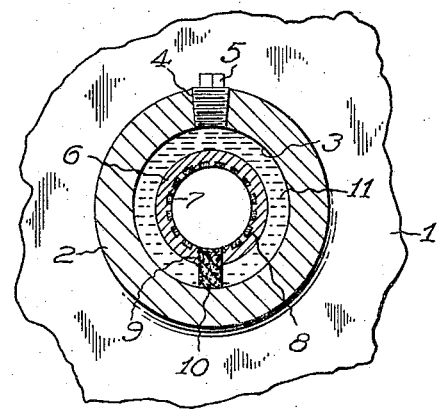
Figure 2 is a front elevation of the same, in section, on the line II—II of Figure 1.

Referring to Figs. 1 and 2, the metal vertically disposed stationary support 1, is provided with a boss or other extended portion 2 having an opening formed therethrough, which is surrounded by an annular groove 3. Said boss portion having an opening 4 therein communicating with the groove, into which is removably fitted a closure plug 5, which, if preferred may be in the form of a grease cup, or other closure means.

Fitted within the opening is a bronze bearing sleeve 6, which, when so fitted converts the groove 3 into a substantially air tight reservoir.

The bearing surface of the bushing is provided with a plurality of spaced bodies of antifriction material, preferably of granular graphite compound of somewhat porous nature which, in this instance, is in the form of paralled elongated bodies 7 disposed in equidistantly spaced grooves 8, the grooves being filled therewith while in a plastic condition and subsequently treated to harden same.

The bushing is further provided with an opening 9, within which is fitted a soft absorbent member or plug 10 of felt, and extends down into the reservoir.

The reservoir is, in practice, filled with grease 11 of semiliquid nature, being placed therein by a force pump or other means, through the plug opening 4.

Figure 3:
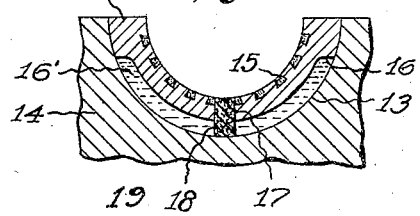
Figure 3 is a transverse section through a modified bearing, or part thereof, with its supporting member.

In Fig. 3 there is shown a modification in the form of one of a pair of substantially semicircular bearings, in which the bearing 12 is disposed within a semicircular seat 13 within a supporting member or housing 14. The bearing is provided with antifriction bodies 15 of lubricating compound similar to that of the bearing sleeve above described, the underside of said bearing having a pocket or cavity 16 which, when fitted within the support, constitutes a reservoir for grease 16'. The bearing is also provided with one or more openings 17 within which is fitted a felt absorbent plug 18 extending in the grease 19 within the reservoir.

The bearing may be employed for either slow or high speed service. At slow speed, the lubricating compound will, of itself, be sufficient as a lubricant, as it will form a film separating the bearing metal from that of the shaft or journal.

At high speed, under certain applications of this type of bearing, the compound film is not of itself a sufficient lubricant to reduce the friction to a normal operating temperature.

*In practice*

Assuming that either one of the forms of bearing shown be employed in connection with a high speed shaft or journal, the stable graphited lubricant not being of itself sufficient to maintain a constant low friction, the temperature of the bearing will rise beyond the radiating capacity, thus causing the grease stored in the reservoir to soften and automatically feed same to the bearing surface by the capillarity of the absorbent plug, thereby filling the pores of the stable lubricant and also forming a combined compound and grease film between the shaft or journal and the bearing, thereby lowering the friction. As soon as the grease is thus taken up by the bearing and compound, the friction will at once be reduced, causing the temperature to rapidly drop. The reduction of temperature causes the grease to again thicken, cutting off capilliary action thereby automatically cutting off the grease supply.

The supplemental lubricant, or grease, taken up by the bearing will be sufficient to permit the shaft or journal to freely operate for a considerable period of time, but as soon as the supply of grease becomes inefficient or exhausted, the temperature of the bearing again rises, causing another supply of grease to be automatically taken up by the bearing.

By means of this device efficient lubrication of the bearings will be effective within 100 degrees F. of the surrounding temperature, depending upon the consistency of the grease employed.

By automatically supplying the additional lubricant or grease to the bearing, at intervals under control of abnormal temperature created, it will be apparent that no attention will be required and that only infrequent renewal of grease in the reservoir will be required.

I have shown and described the grease reservoirs as being in complete form as comprising two parts, the bearing proper and its support, but, while I have not shown it as such, it will be obvious that the reservoir may be wholly formed within the bearing, and be within the spirit of my invention.

Having thus shown and described my invention, what I claim and desire to secure by Letters Patent, is—

1. A bearing device comprising a vertically disposed stationary member having a laterally projecting hub with a grease reservoir formed therein and provided with oppositely disposed bearing openings in the walls thereof, a sleeve bearing extending through said reservoir and rigidly fitted in said openings there being an opening in the wall of said sleeve communicating with the reservoir, a plurality of graphite lubricating bodies embedded longitudinally within said sleeve bearing and extending through the ends thereof, and an absorbent member fitted within said sleeve opening and extending from the bearing surface into the reservoir, said absorbent member adapted to feed grease to the bearing surface at such intervals only as when the bearing becomes heated sufficient to thin the grease to its feed consistency.

2. A bearing device comprising a vertically disposed stationary member having a grease reservoir formed therein and provided with oppositely disposed bearing openings in the walls thereof, a sleeve bearing extending through said reservoir and rigidly secured at its ends in said openings, there being an opening in the under side of the sleeve communicating with the reservoir and a plurality of spaced longitudinal grooves within its bearing surface through the ends thereof, graphite lubricating material filling said grooves, and a soft absorbent material fitted in said sleeve opening and extending from the bearing surface down into the reservoir, said absorbent material adapted to feed grease to the bearing at such intervals only as will occur when the bearing becomes sufficiently heated as to thin the grease to its feed consistency.

3. A bearing device comprising a stationary member having an integral annular laterally projecting hub with a grease reservoir formed therein and provided with centrally disposed and opposite sleeve bearing openings in the walls of the reservoir, a sleeve bearing extending through said reservoir and rigidly fixed in said openings at its ends, said sleeve having an opening in its underside communicating with the reservoir and having spaced longitudinal grooves in its bearing surface, a felt absorbent member fitted in said sleeve opening and extending down into the reservoir, and graphite lubricating material filling said sleeve grooves, said felt member adapted to feed grease from the reservoir up to the bearing at such intervals only as when the bearing becomes heated sufficient to thin the grease to its feed consistency.

In testimony whereof I affix my signature.

CARL H. LEIS.